United States Patent
Luo et al.

(10) Patent No.: US 12,271,258 B2
(45) Date of Patent: Apr. 8, 2025

(54) SERVER FAULT DIAGNOSIS SYSTEM AND SERVER FAULT DIAGNOSIS METHODS

(71) Applicant: SUZHOU METABRAIN INTELLIGENT TECHNOLOGY CO., LTD., Jiangsu (CN)

(72) Inventors: Siheng Luo, Jiangsu (CN); Cai Kong, Jiangsu (CN); Yang Yang, Jiangsu (CN); Zhanliang Chen, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/702,294

(22) PCT Filed: Dec. 22, 2022

(86) PCT No.: PCT/CN2022/141136
§ 371 (c)(1),
(2) Date: Apr. 17, 2024

(87) PCT Pub. No.: WO2023/173874
PCT Pub. Date: Sep. 21, 2023

(65) Prior Publication Data
US 2024/0330099 A1    Oct. 3, 2024

(30) Foreign Application Priority Data

Mar. 14, 2022   (CN) .......................... 202210244350.7

(51) Int. Cl.
G06F 11/00 (2006.01)
G06F 11/07 (2006.01)

(52) U.S. Cl.
CPC ................................. G06F 11/079 (2013.01)

(58) Field of Classification Search
None
See application file for complete search history.

(56) References Cited

U.S. PATENT DOCUMENTS

| 6,172,428 B1 * | 1/2001 | Jordan ...................... H02P 9/04 |
| | | 290/40 C |
| 2012/0101756 A1* | 4/2012 | Leung ................... G01K 1/026 |
| | | 702/64 |

(Continued)

FOREIGN PATENT DOCUMENTS

| CN | 109101402 A | 12/2018 |
| CN | 111125171 A | 5/2020 |

(Continued)

OTHER PUBLICATIONS

Google Scholar/Patents search—text refined (Year: 2024).*
Google Scholar/Patents search—text refined (Year: 2025).*

*Primary Examiner* — Christopher S McCarthy
(74) *Attorney, Agent, or Firm* — IPro, PLLC

(57) ABSTRACT

A device fault diagnosis system includes: a data sampling chip, a first memory, and a processor, wherein the data sampling chip includes a plurality of data collection channels; the data sampling chip collects working data of monitoring positions electrically connected to respective data collection channels, in a device to be monitored, through the respective data collection channels; when determining that the working data of a first monitoring position is abnormal, generates an interrupt signal corresponding to the first monitoring position; and transmits the interrupt signal to the first memory; the first memory stores the working data of the first monitoring position within a preset time period starting from a moment when the interrupt signal is received, into a preset position; and the processor periodically polls the data sampling chip, and after determining that the data sampling chip generates the interrupt signal, reads the working data from the preset position.

19 Claims, 5 Drawing Sheets

(56) References Cited

U.S. PATENT DOCUMENTS

2020/0341847 A1* 10/2020 Boehm ................ G11C 29/52
2021/0242928 A1    8/2021 Park

FOREIGN PATENT DOCUMENTS

| CN | 111625389 A |   | 9/2020 |
|----|-------------|---|--------|
| CN | 111722953 A |   | 9/2020 |
| CN | 114090379 A | * | 2/2022 |
| CN | 114327993 A |   | 4/2022 |
| CN | 114706703 A |   | 7/2022 |

* cited by examiner

SERVER FAULT DIAGNOSIS SYSTEM AND SERVER FAULT DIAGNOSIS METHODS

CROSS-REFERENCE TO RELATED APPLICATION

This application claims priority to the Chinese patent application filed with the China Patent Office on Mar. 14, 2022, with application number 202210244350.7 and the application title "DEVICE FAULT DIAGNOSIS SYSTEM AND DEVICE FAULT DIAGNOSIS METHODS", the entire content of which is incorporated into the present application by reference.

FIELD

Embodiments of the present application relate to the field of power electronics technology, and in particular, to a device fault diagnosis system and a fault diagnosis method.

BACKGROUND

Currently, in the field of data computer room maintenance, remote management systems are usually used to monitor and manage thousands of servers in the computer room. Once an abnormal power outage occurs on a machine in the computer room, especially for some faulty machines in the computer room, there is a problem of a small probability of recurrence of some key Voltage Regulator (VR), such that a fault phenomenon is difficult to be reproduced in a short period of time when a machine downtime or a power outage is triggered.

In order to understand relevant signal waveforms when a fault occurs, research and development engineers need to go to a site and use an oscilloscope to measure signal waveforms of voltage, current, and temperature, and so on. By analyzing collected voltage waveforms when the fault occurs, a concrete cause of a server baseboard VR abnormality is located.

Therefore, on-site fault location requires investing a lot of time and effort to reproduce problems and measure signals, which not only occupies a large amount of research and development resources, but also reduces timeliness of problem location and solution.

SUMMARY

The application provides a device fault diagnosis system and fault diagnosis method, to solve a problem that on-site fault location requires investing a lot of time, effort and labor costs, and low timeliness of problem location and resolution in the prior art.

In a first aspect, the present application provides a device fault diagnosis system, and the system includes:
  a data sampling chip, a first memory, and a processor, wherein the data sampling chip includes a plurality of data collection channels;
  the data sampling chip is configured to: collect working data of monitoring positions electrically connected to respective data collection channels, in a device to be monitored, through the respective data collection channels; when it is determined that the working data of a first monitoring position is abnormal, generate an interrupt signal corresponding to the first monitoring position; and transmit the interrupt signal to the first memory;
  the first memory is configured to: store the working data of the first monitoring position within a preset time period starting from a moment when the interrupt signal is received, into a preset position; and
  the processor is configured to: periodically poll the data sampling chip, and after determining that the data sampling chip generates the interrupt signal, read the working data from the preset position;
  determine the monitoring position where a fault occurs, based on the preset position; and
  generate a preset display image, based on the working data, wherein the display image is configured to determine a cause of the fault of the device to be monitored.

In some embodiments, when a number of the first memories is the same as a number of the data collection channels, and each data collection channel corresponds to one first memory, the data sampling chip is configured to transmit the interrupt signal to the first memory corresponding to the data collection channel, and generate transmission path information corresponding to the interrupt signal; and
  the processor is concretely configured to determine the first memory that stores the working data of the first monitoring position, based on the transmission path information; and
  determine the monitoring position where the fault occurs, based on the first memory that stores the working data of the first monitoring position.

In some embodiments, when the system further includes a second memory, the processor is further configured to generate a control signal after determining that the data sampling chip generates the interrupt signal; and send the control signal to the second memory; and
  the second memory is configured to, based on the control signal, read the working data from the first memory and save the working data, so that the processor reads the working data from the second memory, wherein a storage data cycle of the second memory is greater than a storage data cycle of the first memory.

In some embodiments, the data sampling chip is an analog-to-digital converter chip.

In some embodiments, the data collection channels are voltage collection channels.

In some embodiments, the processor is further configured to send the display image and information of the monitoring position of the fault, to a preset terminal device, so as to display the image and the information of the monitoring position of the fault, through the preset terminal device.

In some embodiments, the data sampling chip and the processor are connected through an integrated circuit (I2C) bus; and the data sampling chip and the first memory are connected through a serial peripheral interface (SPI) bus.

In some embodiments, the device to be monitored includes a plurality of monitoring positions, and the plurality of monitoring positions are different voltage regulators.

In some embodiments, each of the data collection channels corresponds to one of the monitoring positions.

In some embodiments, the working data of the first monitoring position is an analog voltage in the first monitoring position; and
  the data sampling chip is further configured to convert the analog voltage into a digital voltage; determine whether the digital voltage is within a preset voltage range corresponding to the first monitoring position, wherein the preset voltage range includes an upper limit of the voltage range; and if the digital voltage is higher than the upper limit of the voltage range, determine that the working data of the first monitoring position is abnormal.

In some embodiments, the preset voltage range further includes a lower limit of the voltage range; and the data sampling chip is further configured to, if the digital voltage is lower than the lower limit of the voltage range, determine that the working data of the first monitoring position is abnormal.

In some embodiments, the processor is a baseboard management controller.

In some embodiments, the first memory is a dynamic random access memory; and the second memory is a flash memory.

In some embodiments, when a number of the monitoring positions of the device to be monitored exceeds a number of the data collection channels corresponding to one data sampling chip, the system adopts a plurality of data sampling chips to collect the working data of different monitoring positions.

In some embodiments, the plurality of data sampling chips are provided with voltage threshold registers respectively, and the voltage threshold registers are configured to distinguish different data collection channels.

In some embodiments, the processor is further configured to access the different data sampling chips through addressing, and program and set voltage threshold values of the voltage threshold registers of addressed data sampling chips.

In some embodiments, the data sampling chip is further configured to transmit the working data of different monitoring positions within the preset time period to the first memory.

In a second aspect, the present application provides a device fault diagnosis method, wherein the method is performed by the data sampling chip in the device fault diagnosis system according to the first aspect, and the method includes:

collecting the working data of the monitoring positions electrically connected to the respective data collection channels, in the device to be monitored;

when it is determined that the working data of the first monitoring position is abnormal, generating the interrupt signal corresponding to the first monitoring position; and transmitting the interrupt signal to the first memory, so that the first memory stores the working data of the first monitoring position within the preset time period starting from the moment when the interrupt signal is received, into the preset position of the first memory, wherein the working data is configured to determine the cause of the fault of the device to be monitored, and the preset position is configured to identify the position of the fault of the device to be monitored.

In a third aspect, the present application provides a device fault diagnosis method, wherein the method is performed by the processor in the device fault diagnosis system as introduced in the first aspect, and the method includes:

periodically polling the data sampling chip, and after determining that the data sampling chip generates the interrupt signal, reading the working data from the preset position of the first memory;

determining the monitoring position where the fault occurs, based on the preset position; and generating the preset display image, based on the working data, wherein the display image is configured to determine the cause of the fault of the device to be monitored.

In some embodiments, after generating the preset display image based on the working data, the method further includes:

sending the display image and the information of the monitoring position of the fault, to the preset terminal device, so as to display the image and the information of the first monitoring position, through the preset terminal device.

Compared with existing technology, the above technical solutions provided by the embodiments of the present application have the following advantages:

In the method provided by the embodiments of the present application, the data sampling chip collects the working data of the monitoring positions that are electrically connected to the data collection channels, in the device to be monitored, through the respective data collection channels. When it is determined that the working data of the first monitoring position is abnormal, the interrupt signal corresponding to the first monitoring position is generated, and the interrupt signal is transmitted to the first memory. The first memory stores the working data of the first monitoring position within the preset time period starting from the moment when the interrupt signal is received, to the preset storage position. The processor periodically polls the data sampling chip, and after determining that the interrupt signal is generated in the data sampling chip, the processor reads the working data from the preset position; and then, the processor determines the monitoring position where the fault occurs, based on the preset position, and generates the preset display image based on the working data, wherein the display image is configured to confirm the cause of the fault by the working personnel. In this way, not only the monitoring position where the fault occurs, and the cause of the fault, may be determined, more importantly, this method does not require the working personnel to go to sites, and does not need to measure signal waveforms of voltage, current, temperature, and so on, by an oscilloscope. On-site fault location does not require a lot of time and effort to find problems, which saves a lot of research and development resources. Moreover, the cause of the fault may be directly determined based on the display image, and the position of the fault may be determined directly based on the storage position of the working data, which greatly improves timeliness of problem location and resolution Moreover, since it is no longer to use an oscilloscope, and so on, to measure the signal waveforms of voltage, current, temperature, and so on, it may avoid a situation where the above-mentioned signal waveforms cannot be obtained through the oscilloscope when the device to be monitored fails, thereby avoiding occurrence of the situation where the cause of the fault cannot be determined due to the fault of the device.

DETAILED DESCRIPTION OF THE EMBODIMENTS

In order to make the purpose, technical solutions and advantages of the embodiments of the present application clearer, the technical solutions in the embodiments of the present application will be clearly and completely described below in conjunction with the drawings in the embodiments of the present application. Apparently, the described embodiments are a part of the embodiments of the present application, not all embodiments. Based on the embodiments in the present application, all other embodiments obtained by those of ordinary skill in the art without creative efforts fall within the scope of protection of the present application.

In order to facilitate understanding of the embodiments of the present application, some embodiments will be further explained below with reference to the accompanying drawings. The embodiments do not constitute limitations to the embodiments of the present application.

Figure 1:
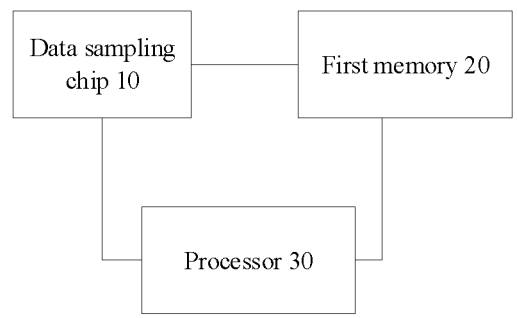
FIG. 1 is a schematic structural diagram of a device fault diagnosis system provided by an embodiment of the present application.

With regarding to the technical problems mentioned in the background art, an embodiment of the present application provides a device fault diagnosis system, which may be referred to FIG. 1 for details. FIG. 1 is a schematic structural diagram of a device fault diagnosis system provided by an embodiment of the present application, and the system includes: a data sampling chip 10, a first memory 20, and a processor 30, wherein the data sampling chip 10 includes a plurality of data collection channels.

The data sampling chip 10 is configured to: collect working data of monitoring positions electrically connected to respective data collection channels, in a device to be monitored, through the respective data collection channels; when it is determined that the working data of a first monitoring position is abnormal, generate an interrupt signal corresponding to the first monitoring position; and transmit the interrupt signal to the first memory 20.

The first memory 20 is configured to: store the working data of the first monitoring position within a preset time period starting from a moment when the interrupt signal is received, into a preset position.

The processor 30 is configured to: periodically poll the data sampling chip 10, and after determining that the data sampling chip 10 generates the interrupt signal, read the working data from the preset position;

determine the monitoring position where a fault occurs, based on the preset position; and generate a preset display image, based on the working data, wherein the display image is configured to determine a cause of the fault of the device to be monitored.

Concretely, each of the data collection channels in the data sampling chip 10 corresponds to one monitoring position in the device to be monitored. Taking a fault location scenario of a baseboard power supply of a dual-channel server as an example, the monitoring positions are, for example, different voltage regulators (VRs for short). A baseboard power supply system of the dual-channel server includes double data rate SDRAM (DDR for short) VRs, central processing unit (CPU for short) VRs, or system VRs, defined as SYS (System) VRs, for example, includes a DDR0 VR, a DDR1 VR, a CPU0 VR, a CPU1 VR, a SYS VR0, a SYS VR1, . . . , a SYS VRN, and so on.

Each of the different VRs corresponds to a certain data collection channel of the data sampling chip 10. Each of different data collection channels of the data sampling chip 10 collects the working data in the VR that is electrically connected to the data collection channel.

When it is determined that the working data in the first monitoring position (for example, CPU0 VR) is abnormal, an interrupt signal corresponding to the first monitoring position is generated, and the interrupt signal is transmitted to the first memory 20.

In some embodiments, the data collection channels are voltage collection channels. The corresponding collected working data is voltage data in different VRs.

In some embodiments, the data sampling chip 10 may be, for example, an analog-to-digital converter (ADC for short) chip.

Then, when judging whether the working data is abnormal, a collected analog voltage may be converted into a digital voltage, and then it may be determined whether the collected voltage data is within a preset voltage range corresponding to the VR. If it is higher than an upper limit of the voltage range or lower than a lower limit of the voltage range, it means that the working data is abnormal, and an interrupt signal corresponding to the first monitoring position needs to be generated and transmitted to the first memory 20.

In addition, considering that simply relying on the voltage data collected at a certain time, it is usually impossible to directly determine the cause of the fault at a certain monitoring position (excluding a circumstance where a voltage is collected at a certain special moment and the voltage at the moment is sufficient to determine the cause of the fault), therefore, the first memory 20 is required to store the working data of the first monitoring position within the preset time period, to the preset position, starting from the moment when the interrupt signal is received. The preset time period mentioned here is a preset time period starting from the moment when the interrupt signal is received, so that the processor 30 may subsequently determine the cause of the fault based on the working data collected within the preset time period.

Among them, the processor 30 periodically polls the data sampling chip 10. When it is determined that the data sampling chip 10 generates the interrupt signal corresponding to the first monitoring position, the processor 30 reads the working data from the preset position, and subsequently determines the monitoring position where the fault occurred, based on the preset position storing the working data. That is, for different monitoring positions where the faults occur, the positions storing the working data in the first memory 20 will change accordingly, so that it facilitates the processor 30 to determine a position where the fault occurs, based on different storage positions.

Furthermore, the processor 30 may further generate the preset display image based on the working data read from the preset position, wherein the display image is configured to determine the cause of the fault of the device to be monitored.

Concretely, in some embodiments, when the processor 30 has a certain learning ability and after certain training (please refer to a conventional training process for a neural network model, to ensure that the processor 30 may have a certain image recognition ability), the processor 30 may, by itself, determine the cause of the fault, based on the generated image, and transmit the cause of the fault and the position of the fault to a terminal device belonging to working personnel through some means (for example, voice report, email sending, and so on), to inform the working personnel the concrete cause of the fault and the position of the fault.

If the processor 30 does not have the image recognition ability and a machine learning ability, then, in some embodiments, the processor 30 is further configured to send the display image and the monitoring position of the fault, to a preset terminal device. The preset terminal device is the terminal device belonging to the working personnel, so that the working personnel may determine the position and cause of the fault of the device to be monitored, through information of the image and information of the position of the fault displayed by the preset terminal device, and promptly take effective actions.

In the device fault diagnosis system provided by the embodiments of the present application, the data sampling chip collects the working data of the monitoring positions that are electrically connected to the data collection channels, in the device to be monitored, through the respective data collection channels. When it is determined that the working data of the first monitoring position is abnormal, the interrupt signal corresponding to the first monitoring position is generated, and the interrupt signal is transmitted to the first memory. The first memory stores the working data of the first monitoring position within the preset time period starting from the moment when the interrupt signal is received, to the preset storage position. The processor periodically polls the data sampling chip, and after determining that the interrupt signal is generated in the data sampling chip, the processor reads the working data from the preset position; and then, the processor determines the monitoring position where the fault occurs, based on the preset position, and generates the preset display image based on the working data, wherein the display image is configured to confirm the cause of the fault by the working personnel. In this way, not only the monitoring position where the fault occurs, and the cause of the fault, may be determined, more importantly, this method does not require the working personnel to go to sites, and does not need to measure signal waveforms of voltage, current, temperature, and so on, by an oscilloscope. On-site fault location does not require a lot of time and effort to find problems, which saves a lot of research and development resources. Moreover, the cause of the fault may be directly determined based on the display image, and the position of the fault may be determined directly based on the storage position of the working data, which greatly improves timeliness of problem location and resolution.

Moreover, since it is no longer to use an oscilloscope, and so on, to measure the signal waveforms of voltage, current, temperature, and so on, it may avoid a situation where the above-mentioned signal waveforms cannot be obtained through the oscilloscope when the device to be monitored fails, thereby avoiding occurrence of the situation where the cause of the fault cannot be determined due to the fault of the device.

Figure 2:
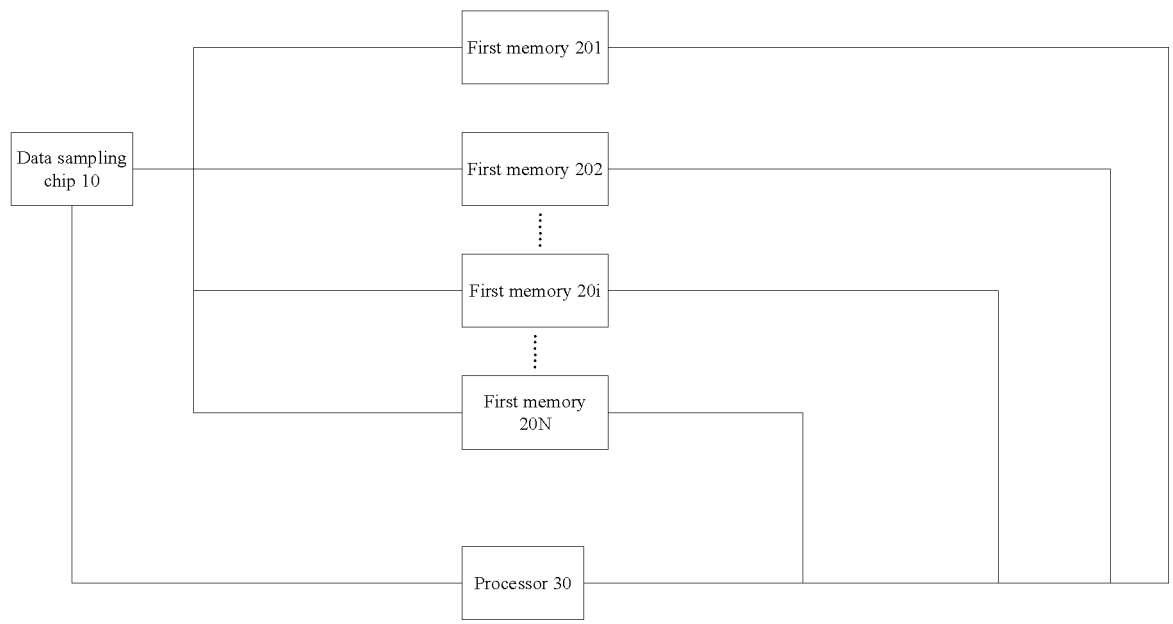
FIG. 2 is a schematic structural diagram of a device fault diagnosis system provided by another embodiment of the present application.

In the above embodiments, it is considered that abnormal working data collected by each data collection channel is stored in the first memory 20. In order to make it easier for the processor 30 to distinguish data collected by the different data collection channels, in the embodiment, the device fault diagnosis system may be further configured to include a plurality of first memories 201, 202, . . . , 20N, wherein N is a positive integer. Moreover, each first memory 20$i$ (i ranges from 1 to N) corresponds to one data collection channel. That is to say, the different monitoring positions of the device to be monitored correspond to the different data collection channels, the different data collection channels correspond to different first memories 20$i$, and the three have a one-to-one correspondence. The details may be referred to FIG. 2, which shows a schematic structural diagram of a device fault diagnosis system provided by another embodiment of the present application.

That is, when a number of the first memories is the same as a number of the data collection channels, and each data collection channel corresponds to one first memory 20$i$, the data sampling chip 10 is configured to transmit the interrupt signal to the first memory 20$i$ corresponding to the data collection channel, and generate transmission path information corresponding to the interrupt signal;

the processor 30 is concretely configured to determine the first memory 20$i$ that stores the working data of the first monitoring position, based on the transmission path information; and determine the monitoring position where the fault occurs, based on the first memory 20$i$ that stores the working data of the first monitoring position.

Concretely, when the first data collection channel in the data sampling chip 10 detects an abnormality in the working data of the first monitoring position, the data sampling chip 10 will directly send the interrupt signal to the first memory 20$i$ corresponding to the first data collection channel. After the first memory 20$i$ receives the interrupt signal, the first memory 20$i$ may directly obtain corresponding abnormal working data from the first data collection channel and store the corresponding abnormal working data. The processor 30 may directly determine which monitoring position fails in the device to be monitored based on the information in the first memory 20$i$, after the processor 30 polls the data sampling chip 10 and determines that the data sampling chip 10 generates the interrupt signal and sends it to the first memory 20$i$ corresponding to the first data collection channel.

Regardless of whether the interrupt signal is distinguished accordingly, the processor 30 may clearly determine which monitoring position of the device to be monitored has a fault, based on the transmission path information, that is, the manner of determining the position of the fault will be clearer, simpler and more convenient.

Figure 3:
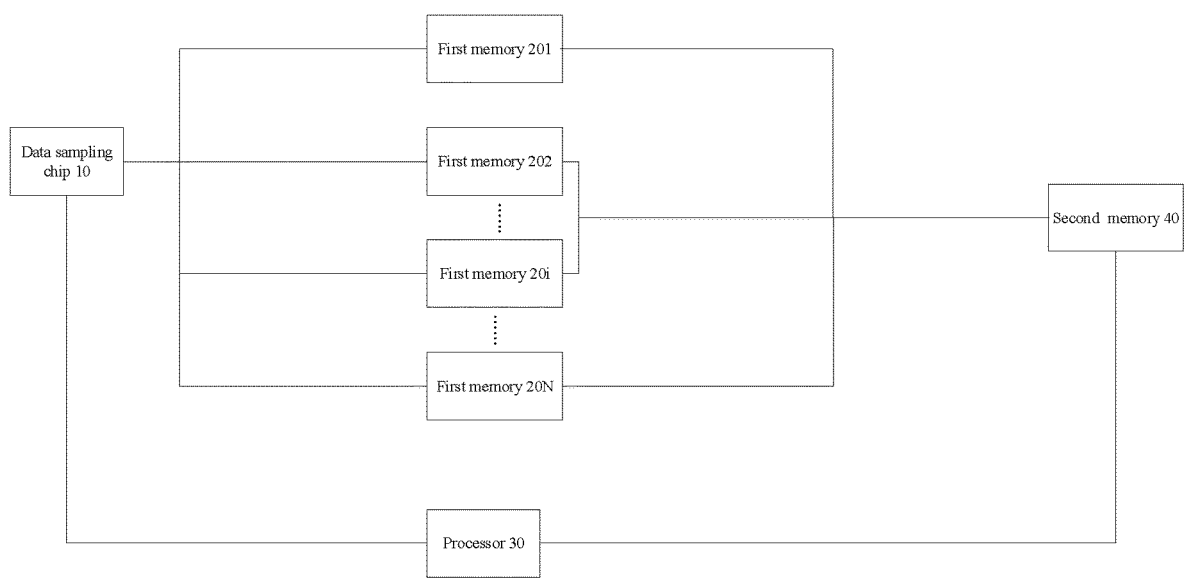
FIG. 3 is a schematic structural diagram of a device fault diagnosis system provided by further another embodiment of the present application.

In some embodiments, the processor 30 is a baseboard management controller (BMC in short), and the first memory 20$i$ is, for example, a dynamic random access memory (DRAM in short). Since the data may be kept only for a very short period of time, and an implementation process that the BMC directly reads data from the DRAM is relatively complicated, therefore, in the embodiments of the present application, a second memory 40 may be further included, wherein the second memory 40 may be a flash memory (FLASH ROM). The details may be referred to FIG. 3, which shows a schematic structural diagram of a device fault diagnosis system provided by further another embodiment of the present application.

Among them, the processor 30 is further configured to generate a control signal after determining that the data sampling chip 10 generates the interrupt signal; and send the control signal to the second memory 40; and the second memory 40 is configured to, based on the control signal, read the working data from the first memory 20$i$ and save the working data, so that the processor 30 may read the working data from the second memory 40, wherein a storage data cycle of the second memory 40 is greater than a storage data cycle of the first memory 20i.

That is, when the BMC determines that the ADC has generated the interrupt signal, the BMC will immediately generate the control signal CS and send the control signal CS to the FLASH ROM. The FLASH ROM will, based on the control signal CS, read the working data from the first memory 20i and save the working data. After the BMC learns that the FLASH ROM has completed reading data, the BMC reads the working data from the FLASH ROM, and then performs subsequent operations, for example, based on the working data, generating the preset display image, and so on.

In some embodiments, in some of the above embodiments, the data sampling chip 10 and the processor 30 are connected through an I2C (Inter-Integrated Circuit, integrated circuit bus) bus; and the data sampling chip 10 and the first memory 20i are connected through an SPI (serial peripheral interface) bus.

That is, the ADC is interconnected with a BMC chip on a baseboard through the I2C bus, the ADC is interconnected with an external DRAM chip through the SPI bus, and the BMC may access the ADC through the I2C bus, wherein the ADC may be a high-speed ADC.

In another example, considering that the ADC generally includes a plurality of (usually 8) data collection channels, if a number of the monitoring positions of the device to be monitored exceeds the number of the data collection channels corresponding to one ADC, a plurality of ADCs may be adopted to collect the working data from the different monitoring positions. Moreover, the BMC may access different ADCs through addressing, and program and set voltage threshold values of voltage threshold registers of the addressed ADCs. The voltage threshold values here are voltage threshold values corresponding to the different monitoring positions mentioned above. Setting the voltage threshold registers in the ADCs is to distinguish the different data collection channels through register addresses, and then distinguish the different monitoring positions.

It should further be noted that, in any of the above embodiments, when the processor 30 periodically polls the data sampling chip 10, a period for polling is usually not set for a long time, for example, 30 seconds, which is mainly considered to prevent a circumstance where the fault occurs in the device to be monitored for a too long time but the fault is not detected by the BMC such that troubleshooting will be delayed. The preset time period may be, for example, a continuous waveform of 40 seconds.

Figure 4:
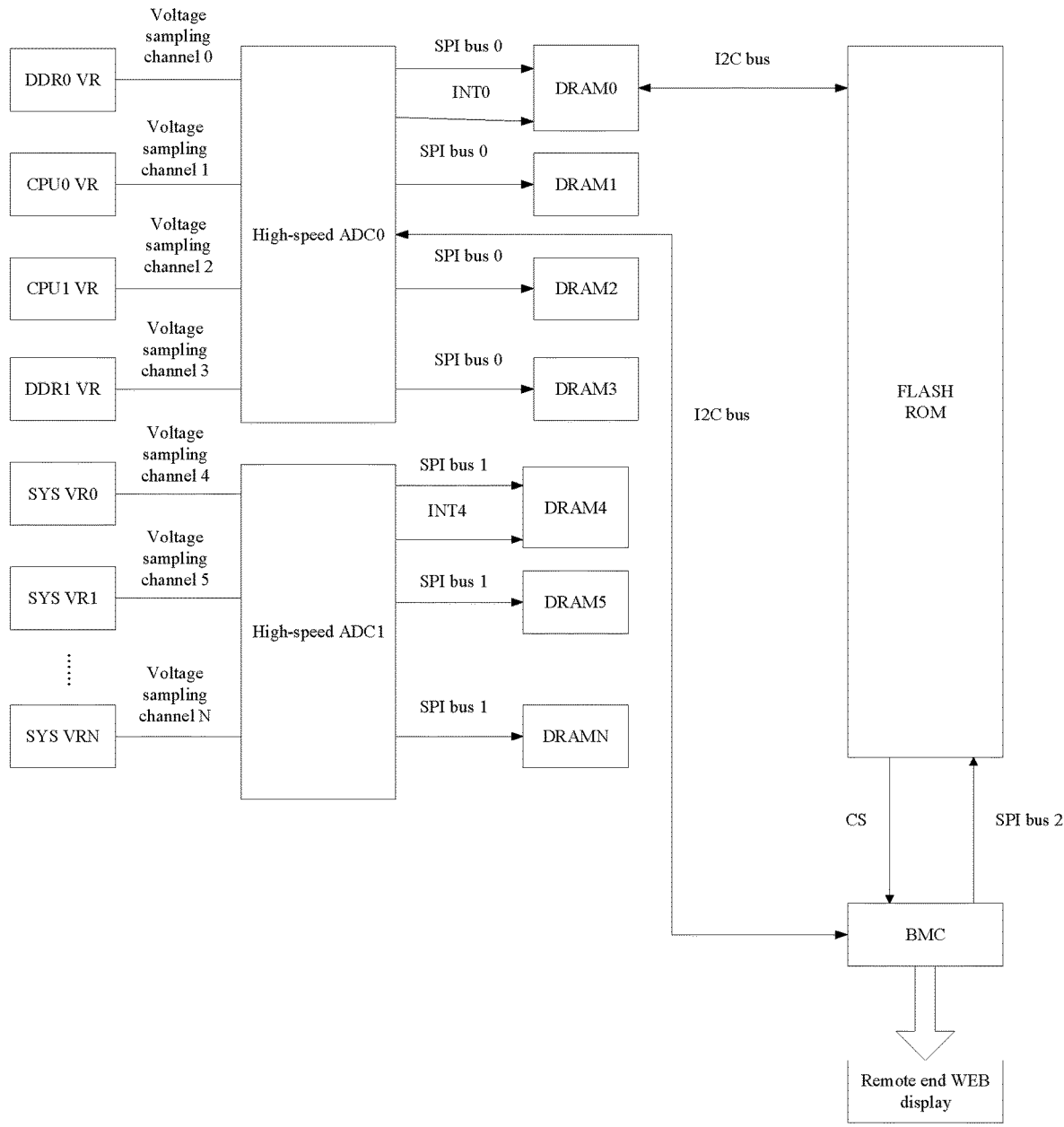
FIG. 4 is a schematic structural diagram of a concrete example of a device fault diagnosis system provided by the present application.

FIG. 4 shows a schematic structural diagram of a concrete example of a device fault diagnosis system. In the example, the data sampling chip 10 includes a high-speed ADC0 and a high-speed ADC1. The processor 30 is the BMC, and the first memories are DRAM0, DRAM1, . . . DRAMn. The monitoring positions include DDR0 VR, DDR1 VR, CPU0 VR, CPU1 VR, SYS VR0, SYS VR1, . . . , SYS VRN, and so on.

A number of DRAMs is the same as a number of voltage sampling channels in VRs. The voltage sampling channel is the data collection channel. The second memory 40 is the FLASH ROM. The high-speed ADCs (for example, the high-speed ADC0, the high-speed ADC1, . . . ) are connected with the DRAMs (for example, the DRAM0, the DRAM1, . . . ) through the SPI bus, to transmit the working data of the different monitoring positions within the preset time period. The high-speed ADCs are connected with the DRAMs through INTs (for example, INT0, INT1, . . . ), to transmit the corresponding interrupt signals. The high-speed ADCs are connected with the BMC through the I2C bus, such that the BMC may access the high-speed ADCs through the I2C bus and program and set the voltage threshold values of the voltage threshold registers of the high-speed ADCs. The BMC may poll interrupt registers of the ADCs through the I2C bus, to obtain the interrupt signal, and after obtaining the interrupt signal, the BMC sends the control signal CS, to realize saving abnormal voltage data of the DRAM into the FLASH ROM.

The BMC further establishes a communication connection with the preset terminal device, to send the cause of the fault (or the preset display image) and the position of the fault to the preset terminal device. The working personnel may remotely log in to a WEB page of the BMC.

Figure 5:
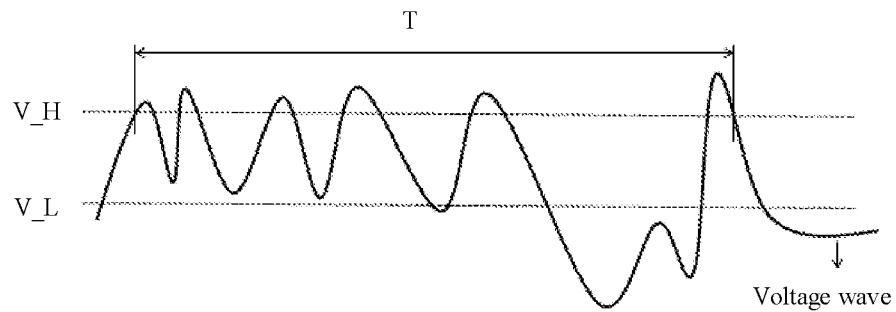
FIG. 5 is a schematic diagram of detection of an abnormal voltage waveform provided by the present application.

FIG. 5 shows is a schematic diagram of detection of an abnormal voltage waveform, as shown in FIG. 5 for details. The voltage waveform includes situations that the voltages exceed an upper voltage limit and situations that the voltage are lower than a lower voltage limit.

In some embodiments, on the baseboard of a server, the BMC chip uses a chip with rich GPIO (General Purpose Input Output, general input/output port) and I2C resources and superior processing performance, with a model: AST2600. The DRAM chip connected to the BMC uses a DDR4 memory cell, with a model: H5AN4G6NBJR-VKC. A FLASH ROM chip connected to the BMC uses a ROM (random access memory) memory chip, with a model: ACA-SPI-006-K01.

The high-speed ADC connected to respective VR voltages of the baseboard, uses a model: ADC128D818CIMTX/NOPB.

Respective groups of VRs: CPU0 VR, CPU1 VR, DDR0 VR, DDR1 VR, SYS VR0, SYS VR1, . . . , SYS VRN are connected to the voltage sampling channels of the high-speed ADC 0 and the high-speed ADC 1 in sequence, and an SPI interface of BMC is interconnected with the FLASH ROM; and the high-speed ADC 0 and the high-speed ADC 1 are interconnected with the BMC through the I2C bus. The high-speed ADC 0 is connected to the DRAM through an INT signal line and an SPI0 bus; and the high-speed ADC 1 is connected to the DRAM through an INT signal line and an SPI1 bus. The DRAM is interconnected with the FLASH ROM through the I2C bus. The FLASH ROM and the BMC are interconnected through an SPI bus 2. The BMC is connected to the FLASH ROM through a chip select signal CS, to control reading of the data saved in the FLASH ROM. Finally, the BMC implements an IPMI (intelligent platform management interface) interface through an RJ45 connector, to achieve network interconnection with a remote end through a network. A user terminal may log in to a web interface to view the abnormal voltage waveform.

It should be noted that, although only an INT0 and an INT4 are shown in FIG. 4, the INT signal line does not only include the INT0 and the INT4. Instead, each DRAM will establish a communication connection with the high-speed ADC through the INT signal line. The connections of other INT signal lines are omitted in FIG. 4, which is only for simplicity of show.

Based on the above, engineers may directly analyze and locate the causes of the faults of power supply VRs, based on the voltage waveforms presented on the WEB interfaces, without going to the sites with the oscilloscope.

The above are system structure embodiments corresponding to the device fault diagnosis system provided by the present application. The following introduces and illustrates embodiments corresponding to the device fault diagnosis method provided by the present application. The details may be referred to the following.

Figure 6:
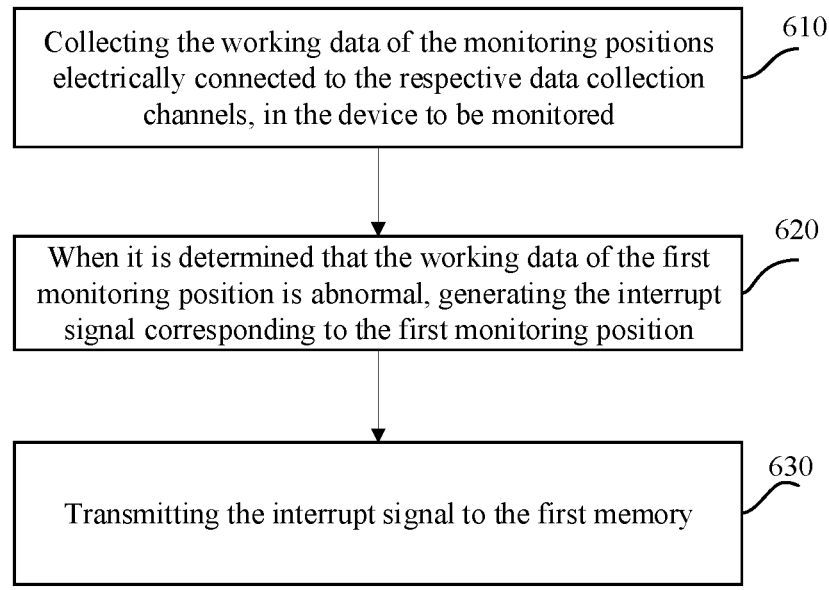
FIG. 6 is a schematic flowchart of a device fault diagnosis method provided by an embodiment of the present application.

FIG. 6 is a device fault diagnosis method provided by an embodiment of the present application. The method is performed by the data sampling chip in the device fault diagnosis system introduced by any of the above. The details may be referred to FIG. 6. The method includes:

Step 610: collecting the working data of the monitoring positions electrically connected to the respective data collection channels, in the device to be monitored;

Step 620: when it is determined that the working data of the first monitoring position is abnormal, generating the interrupt signal corresponding to the first monitoring position; and Step 630: transmitting the interrupt signal to the first memory, so that the first memory stores the working data of the first monitoring position within the preset time period starting from the moment when the interrupt signal is received, into the preset position of the first memory, wherein the working data is configured to determine the cause of the fault of the device to be monitored, and the preset position is configured to identify the position of the fault of the device to be monitored.

Each step in the device fault diagnosis method provided by the embodiments of the present application has been described in detail in the embodiments corresponding to the device fault diagnosis system above, and therefore will not be described in detail here.

In the device fault diagnosis method provided by the embodiments of the present application, the data sampling chip collects the working data of the monitoring positions that are electrically connected to the data collection channels, in the device to be monitored. When it is determined that the working data of the first monitoring position is abnormal, the interrupt signal corresponding to the first monitoring position is generated, and the interrupt signal is transmitted to the first memory, so that the first memory stores the working data of the first monitoring position within the preset time period starting from the moment when the interrupt signal is received, to the preset storage position. In turn, the processor may determine the monitoring position where the fault occurs, based on the preset position, and generates the preset display image based on the working data, so that the working personnel may confirm the cause of the fault. In this way, not only the monitoring position where the fault occurs, and the cause of the fault, may be determined, more importantly, this method does not require the working personnel to go to sites, and does not need to measure signal waveforms of voltage, current, temperature, and so on, by the oscilloscope. On-site fault location does not require a lot of time and effort to find the problems, which saves a lot of research and development resources. Moreover, the cause of the fault may be directly determined based on the display image, and the position of the fault may be determined directly based on the storage position of the working data, which greatly improves the timeliness of the problem location and resolution.

Moreover, since it is no longer to use the oscilloscope, and so on, to measure the signal waveforms of voltage, current, temperature, and so on, it may avoid the situation where the above-mentioned signal waveforms cannot be obtained through the oscilloscope when the device to be monitored fails, thereby avoiding occurrence of the situation where the cause of the fault cannot be determined due to the fault of the device.

Figure 7:
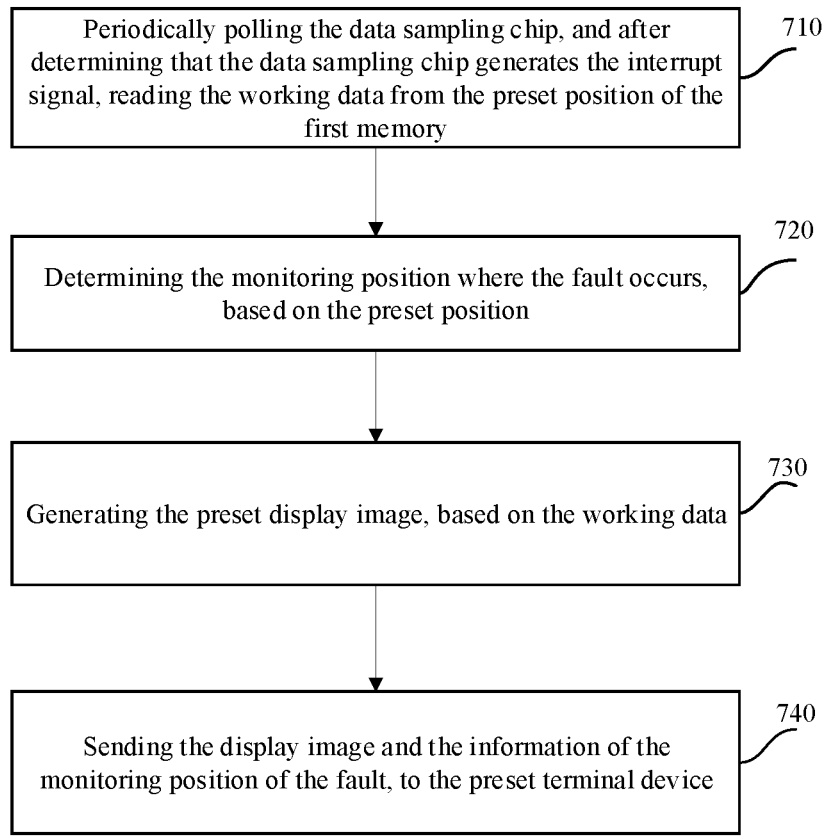
FIG. 7 is a schematic flowchart of a device fault diagnosis method provided by another embodiment of the present application.

FIG. 7 is a schematic flowchart of a device fault diagnosis method provided by another embodiment of the present application. The method is performed by the processor in the device fault diagnosis system introduced by any of the above. The details may be referred to FIG. 7. The method includes:

Step 710: periodically polling the data sampling chip, and after determining that the data sampling chip generates the interrupt signal, reading the working data from the preset position of the first memory;

Step 720: determining the monitoring position where the fault occurs, based on the preset position; and Step 730: generating the preset display image, based on the working data, wherein the display image is configured to determine the cause of the fault of the device to be monitored.

In some embodiments, after generating the preset display image based on the working data, the method further includes:

Step 740: sending the display image and the information of the monitoring position of the fault, to the preset terminal device, so as to display the image and the information of the first monitoring position, through the preset terminal device.

Similar to the above, each step in the device fault diagnosis method provided by the embodiments of the present application has been described in detail in the embodiments corresponding to the device fault diagnosis system above, and therefore will not be described in detail here.

In the device fault diagnosis method provided by the embodiments of the present application, the processor periodically polls the data sampling chip, and after determining that the interrupt signal is generated in the data sampling chip, the processor reads the working data from the preset position of the first memory; and then, the processor determines the monitoring position where the fault occurs, based on the preset position, and generates the preset display image based on the working data, wherein the display image is configured to confirm the cause of the fault by the working personnel. In this way, not only the monitoring position where the fault occurs, and the cause of the fault, may be determined, more importantly, this method does not require the working personnel to go to sites, and does not need to measure signal waveforms of voltage, current, temperature, and so on, by the oscilloscope. On-site fault location does not require a lot of time and effort to find the problems, which saves a lot of research and development resources. Moreover, the cause of the fault may be directly determined based on the display image, and the position of the fault may be determined directly based on the storage position of the working data, which greatly improves the timeliness of the problem location and resolution.

Moreover, since it is no longer to use the oscilloscope, and so on, to measure the signal waveforms of voltage, current, temperature, and so on, it may avoid the situation where the above-mentioned signal waveforms cannot be obtained through the oscilloscope when the device to be monitored fails, thereby avoiding occurrence of the situation where the cause of the fault cannot be determined due to the fault of the device.

It should be noted that in the text, relational terms, for example, "first" and "second", and so on, are only used to distinguish one entity or operation from another entity or operation, and do not necessarily require or imply there is such actual relationship or sequence between the entities or operations. Furthermore, the terms "include", "comprise", or any other variations thereof are intended to cover a non-exclusive inclusion, such that a process, method, article, or apparatus that includes a series of elements not only includes those elements, but also includes other elements not expressly listed, or further includes elements inherent to the process, method, article or device. In a condition that there is no further limitation, an element defined by a statement "includes a . . . ", does not exclude that, in the process, method, article, or device that includes the element, there are still additional identical elements.

The above are only some embodiments of the present application, to enable those skilled in the art to understand or implement the present application. Various modifications to these embodiments will be readily apparent to those skilled in the art, and the generic principles defined herein may be practiced in other embodiments without departing from the spirit or scope of the application. Thus, the present application is not intended to be limited to the embodiments shown herein, but is to be accorded the widest scope consistent with the principles and novel features claimed herein.

The invention claimed is:

1. A server fault diagnosis system, wherein the server fault diagnosis system comprises: a data sampling chip, a first memory, and a processor, wherein the data sampling chip comprises a plurality of data collection channels;

the data sampling chip is configured to: collect working data of monitoring positions electrically connected to respective data collection channels, in a server to be monitored, through the respective data collection channels; in response to determining that the working data of a first monitoring position is abnormal, generate an interrupt signal corresponding to the first monitoring position; and transmit the interrupt signal to a controller of the first memory;

the first memory is configured to: store the working data of the first monitoring position within a preset time period starting from a moment when the interrupt signal is received, into a preset position; and the processor is configured to: periodically poll the data sampling chip, and in response to determining that the data sampling chip generates the interrupt signal, read the working data from the preset position;

determine the monitoring position where a fault occurs, based on the preset position; and generate a preset display image, based on the working data, wherein the display image is configured to be used to determine a cause of the fault of the server to be monitored, wherein the monitoring positions are different voltage regulators.

2. The server fault diagnosis system according to claim 1, wherein a number of the first memories is the same as a number of the data collection channels, each data collection channel corresponds to one first memory, and the data sampling chip is configured to transmit the interrupt signal to the first memory corresponding to the data collection channel, and generate transmission path information corresponding to the interrupt signal; and the processor is further configured to determine the first memory that stores the working data of the first monitoring position, based on the transmission path information; and determine the monitoring position where the fault occurs, based on the first memory that stores the working data of the first monitoring position.

3. The server fault diagnosis system according to claim 1, wherein the server fault diagnosis system further comprises a second memory, the processor is further configured to generate a control signal in response to determining that the data sampling chip generates the interrupt signal; and send the control signal to the second memory; and the second memory is configured to, based on the control signal, read the working data from the first memory and save the working data, so that the processor reads the working data from the second memory, wherein a storage data cycle of the second memory is greater than a storage data cycle of the first memory.

4. The server fault diagnosis system according to claim 1, wherein the data sampling chip is an analog-to-digital converter chip.

5. The server fault diagnosis system according to claim 4, wherein the data collection channels are voltage collection channels.

6. The server fault diagnosis system according to claim 1, wherein the processor is further configured to send the display image and information of the monitoring position of the fault, to a preset terminal device, so as to display the display image and the information of the monitoring position of the fault, through the preset terminal device.

7. The server fault diagnosis system according to claim 1, wherein the data sampling chip and the processor are connected through an integrated circuit bus; and the data sampling chip and the first memory are connected through a serial peripheral interface bus.

8. The server fault diagnosis system according to claim 1, wherein each of the data collection channels corresponds to one of the monitoring positions.

9. The server fault diagnosis system according to claim 1, wherein the working data of the first monitoring position is an analog voltage in the first monitoring position; and the data sampling chip is further configured to convert the analog voltage into a digital voltage; determine whether the digital voltage is within a preset voltage range corresponding to the first monitoring position, wherein the preset voltage range comprises an upper limit of the voltage range; and in response to that the digital voltage is higher than the upper limit of the voltage range, determine that the working data of the first monitoring position is abnormal.

10. The server fault diagnosis system according to claim 9, wherein the preset voltage range further comprises a lower limit of the voltage range; and the data sampling chip is further configured to, in response to that the digital voltage is lower than the lower limit of the voltage range, determine that the working data of the first monitoring position is abnormal.

11. The server fault diagnosis system according to claim 1, wherein the processor is a baseboard management controller.

12. The server fault diagnosis system of claim 11, wherein the first memory is a dynamic random access memory; and the second memory is a flash memory.

13. The server fault diagnosis system according to claim 1, wherein a number of the monitoring positions of the server to be monitored exceeds a number of the data collection channels corresponding to one data sampling chip, and the server fault diagnosis system adopts a plurality of data sampling chips to collect the working data of different monitoring positions.

14. The server fault diagnosis system according to claim 13, wherein the plurality of data sampling chips are provided with voltage threshold registers respectively, and the voltage threshold registers are configured to distinguish different data collection channels.

15. The server fault diagnosis system according to claim 14, wherein the processor is further configured to access the different data sampling chips through addressing, and program and set voltage threshold values of the voltage threshold registers of addressed data sampling chips.

16. The server fault diagnosis system according to claim 1, wherein the data sampling chip is further configured to transmit the working data of different monitoring positions within the preset time period to the first memory.

17. A server fault diagnosis method, wherein the server fault diagnosis method is performed by a data sampling chip in a server fault diagnosis system, wherein the server fault diagnosis system includes: the data sampling chip, a first memory, and a processor, wherein the data sampling chip includes a plurality of data collection channels; the data sampling chip is configured to: collect working data of monitoring positions electrically connected to respective data collection channels, in a server to be monitored, through the respective data collection channels; in response to determining that the working data of a first monitoring position is abnormal, generate an interrupt signal corresponding to the first monitoring position; and transmit the interrupt signal to a controller of the first memory; the first memory is configured to: store the working data of the first monitoring position within a preset time period starting from a moment when the interrupt signal is received, into a preset position; and the processor is configured to: periodically poll the data sampling chip, and in response to determining that the data sampling chip generates the interrupt signal, read the working data from the preset position; determine the monitoring position where a fault occurs, based on the preset position; and generate a preset display image, based on the working data, wherein the display image is configured to be used to determine a cause of the fault of the server to be monitored, wherein the monitoring positions are different voltage regulators; and the server fault diagnosis method comprises:

collecting the working data of the monitoring positions electrically connected to the respective data collection channels, in the server to be monitored;

in response to determining that the working data of the first monitoring position is abnormal, generating the interrupt signal corresponding to the first monitoring position; and transmitting the interrupt signal to the controller of the first memory, so that the first memory stores the working data of the first monitoring position within the preset time period starting from the moment when the interrupt signal is received, into the preset position of the first memory, wherein the working data is configured to determine the cause of the fault of the server to be monitored, and the preset position is configured to identify the position of the fault of the server to be monitored.

18. A server fault diagnosis method, wherein the server fault diagnosis method is performed by a processor in a server fault diagnosis system, wherein the server fault diagnosis system includes: a data sampling chip, a first memory, and the processor, wherein the data sampling chip includes a plurality of data collection channels; the data sampling chip is configured to: collect working data of monitoring positions electrically connected to respective data collection channels, in a server to be monitored, through the respective data collection channels; in response to determining that the working data of a first monitoring position is abnormal, generate an interrupt signal corresponding to the first monitoring position; and transmit the interrupt signal to a controller of the first memory; the first memory is configured to: store the working data of the first monitoring position within a preset time period starting from a moment when the interrupt signal is received, into a preset position; and the processor is configured to: periodically poll the data sampling chip, and in response to determining that the data sampling chip generates the interrupt signal, read the working data from the preset position; determine the monitoring position where a fault occurs, based on the preset position; and generate a preset display image, based on the working data, wherein the display image is configured to be used to determine a cause of the fault of the server to be monitored, wherein the monitoring positions are different voltage regulators; and the server fault diagnosis method comprises:

periodically polling the data sampling chip, and in response to determining that the data sampling chip generates the interrupt signal, reading the working data from the preset position of the first memory;

determining the monitoring position where the fault occurs, based on the preset position; and generating the preset display image, based on the working data, wherein the display image is configured to be used to determine the cause of the fault of the server to be monitored.

19. The server fault diagnosis method according to claim 18, wherein, after generating the preset display image based on the working data, the server fault diagnosis method further comprises:

sending the display image and the information of the monitoring position of the fault, to the preset terminal device, so as to display the image and the information of the first monitoring position, through the preset terminal device.

* * * * *